United States Patent
Dufour

(10) Patent No.: US 7,026,809 B2
(45) Date of Patent: Apr. 11, 2006

(54) MAGNETIC SENSOR FOR DETECTING POSITION AND/OR SPEED OF A MOBILE TARGET

(75) Inventor: Laurent Dufour, Saint Maurice de Gourdans (FR)

(73) Assignee: Electricfil Industrie, Miribel Cedex (FR)

( * ) Notice: Subject to any disclaimer, the term of this patent is extended or adjusted under 35 U.S.C. 154(b) by 207 days.

(21) Appl. No.: 10/388,625

(22) Filed: Mar. 17, 2003

(65) Prior Publication Data

US 2003/0178990 A1 Sep. 25, 2003

(30) Foreign Application Priority Data

Mar. 19, 2002 (FR) .................................. 02 03362

(51) Int. Cl.
*G01B 7/30* (2006.01)

(52) U.S. Cl. .............................. 324/207.2; 324/207.25; 324/174

(58) Field of Classification Search ................ 324/173, 324/174, 207.12, 207.2, 207.22, 207.24, 324/207.25, 251; 338/32 R, 32 H
See application file for complete search history.

(56) References Cited

U.S. PATENT DOCUMENTS

| 4,066,962 A | * | 1/1978 | Jaffe ........................ 324/207.2 |
| 4,293,837 A | * | 10/1981 | Jaffe et al. ................. 338/32 H |
| 4,401,944 A | * | 8/1983 | Narimatsu et al. ...... 324/207.21 |
| 5,781,005 A |   | 7/1998 | Vig et al. |
| 5,814,985 A |   | 9/1998 | Oudet |

FOREIGN PATENT DOCUMENTS

DE 19803018 9/1998

* cited by examiner

*Primary Examiner*—Jay Patidar
(74) *Attorney, Agent, or Firm*—Dennison, Schultz, Dougherty & MacDonald

(57) ABSTRACT

The invention relates to a position and/or speed sensor including a mobile target (2) with at least one tooth, a first permanent magnet (5), at least one second permanent magnet (11), and a probe (4) sensitive to the direction and intensity of a magnetic induction, and placed along an axis OZ such that when there is no adjacent tooth, the magnetic induction created by the first magnet passes through the probe along a direction opposite to the direction of magnetization. Magnetic inductions created by the permanent magnets (5, 11) have approximately equal values but in opposite directions, and in the presence of an adjacent tooth, the absolute value of the variation of the magnetic induction detected by the probe (4) is greater than a trip threshold.

9 Claims, 1 Drawing Sheet

MAGNETIC SENSOR FOR DETECTING POSITION AND/OR SPEED OF A MOBILE TARGET

BACKGROUND OF THE INVENTION

This invention relates to the technical domain of sensors sensitive to the direction and intensity of a magnetic induction to detect the position and/or speed of a mobile target in the general sense.

The purpose of the invention relates particularly to the domain of TPOS (True Power On Sensor) type magnetic sensors capable of supplying information about the position of a mobile target immediately after they are switched on.

Several sensors of this type are known in the state of the art. Thus a position and/or speed sensor is known comprising a mobile target made from a soft material and with at least one and in general a series of mobile teeth in a direction perpendicular to an OZ direction. This type of sensor also comprises a permanent magnet magnetized in the positive or negative direction along the OZ defining an air gap with the mobile target. A probe sensitive to the direction and intensity of a magnetic induction is placed in the air gap such that its axis of greatest sensitivity is approximately along the OZ axis. Conventionally, this type of probe sensitive to the direction and intensity of a magnetic induction is a Hall effect cell.

Displacement of the mobile target causes a variation of the magnetic induction passing through the probe each time that a tooth passes in front of the probe, thus outputting an electrical signal that depends on the direction and the amplitude of the magnetic induction. This sensitive probe is associated particularly with a hysterisis level comparator with an output that is equal to a first logical state when the electrical signal output by the probe is greater than a predetermined threshold, and a second logical state when the electrical signal is less than a predetermined threshold.

Determination of the position of a mobile target requires that an attempt should be made to make the sensor operate at magnetic induction values close to Zero Gauss, while supplying a sufficient magnetic induction excursion to be detectable, in order to be independent of magnet temperature drifts.

To achieve this objective, proposals have been made in the state of the art to make the magnet in the shape of a U, in which the two branches are directed towards the target and the sensitive probe is inserted between the branches to measure the Z component of the magnetic induction. The magnet is provided with a cavity in order to detect the variation of the magnetic induction around an induction value close to Zero Gauss.

The previous known solution has a major disadvantage related to the complex shapes of the magnet that impose the use of composite materials such as rare earth based plasto magnets that are well adapted to making complex shaped magnets by casting, but for which the intrinsic magnetic performances are very much lower than the performances of pure rare earth magnets. Thus, the use of a material with low magnetic performances can have negative effects on the volume of the magnet and the dimension and cost of such a sensor. Furthermore, optimization of the performances of such a sensor depends mainly on the performances of the magnet, and becomes expensive and difficult.

Similarly, patent U.S. Pat. No. 5,781,005 describes a magnet operating at magnetic induction values close to Zero Gauss. This type of sensor comprises a magnetic structure placed behind the plane of a Hall effect probe and placed such that a South pole and a North pole are adjacent to the Hall effect probe. Apart from the difficulties in assembling the probe with respect to the magnetic structure, it should be noted that the magnetic structure is set back from the measurement air gap such that the magnetic induction is only slightly disturbed by the passage of the mobile target.

Furthermore, document DE 19 803 018 also proposes a sensor operating at magnetic induction values close to Zero Gauss. However, it should be noted that the sensitive probe is set back from the magnet extension plane and consequently the plane in which the mobile target is moving, such that good measurement sensitivity cannot be obtained.

SUMMARY OF THE INVENTION

Therefore, the purpose of the invention is to overcome the disadvantages of previously known solutions by proposing a position and/or speed sensor that is not very sensitive to magnet temperature drifts, while having good performances and being compact and low cost.

The invention proposes a position and/or speed sensor comprising the following, in order to achieve this objective:

a mobile target made of a soft material with at least one mobile tooth moving in a direction perpendicular to an OZ direction, a first permanent magnet magnetized along the positive or negative OZ direction and defining an air gap with the mobile target, and a probe sensitive to the direction and intensity of a magnetic induction, arranged in the air gap in an XOY extension plane such that its axis of greatest sensitivity is approximately along the OZ axis.

According to the invention:

the sensor comprises at least one second permanent magnet magnetized along a direction perpendicular to the OZ direction such that the corresponding magnetic induction passes through the probe in the direction opposite to the direction of the magnetic induction created by the first permanent magnet, in the absence of a tooth, and the probe is located on the OZ axis such that when there is no tooth, the magnetic induction created by the first magnet passes through the probe along a direction opposite to the direction of magnetization and magnetic inductions created by the permanent magnets have approximately equal values but in the opposite direction, and that in the presence of a tooth the absolute value of the variation of the magnetic induction detected by the probe is at least greater than a trip threshold.

According to one variant embodiment, the probe is located on the OZ axis such that in the presence of a tooth, the variation of the magnetic induction detected by the probe originates from a reduction in the absolute value or an inversion in the direction of the magnetic induction created by the first magnet.

According to another variant embodiment, the probe is located on the OZ axis so that in the presence of a tooth, the variation of magnetic induction detected by the probe originates from an increase in the absolute value of the magnetic induction created by the second magnet, and also preferably a reduction in the absolute value or an inversion in the direction of the magnetic induction created by the first magnet.

BRIEF DESCRIPTION OF THE DRAWINGS

Various other characteristics of the invention will become clear after reading the description made below with reference to the attached drawings that provide non-restrictive examples of one embodiment of the invention.

DESCRIPTION OF THE PREFERRED EMBODIMENTS

Figure 1:
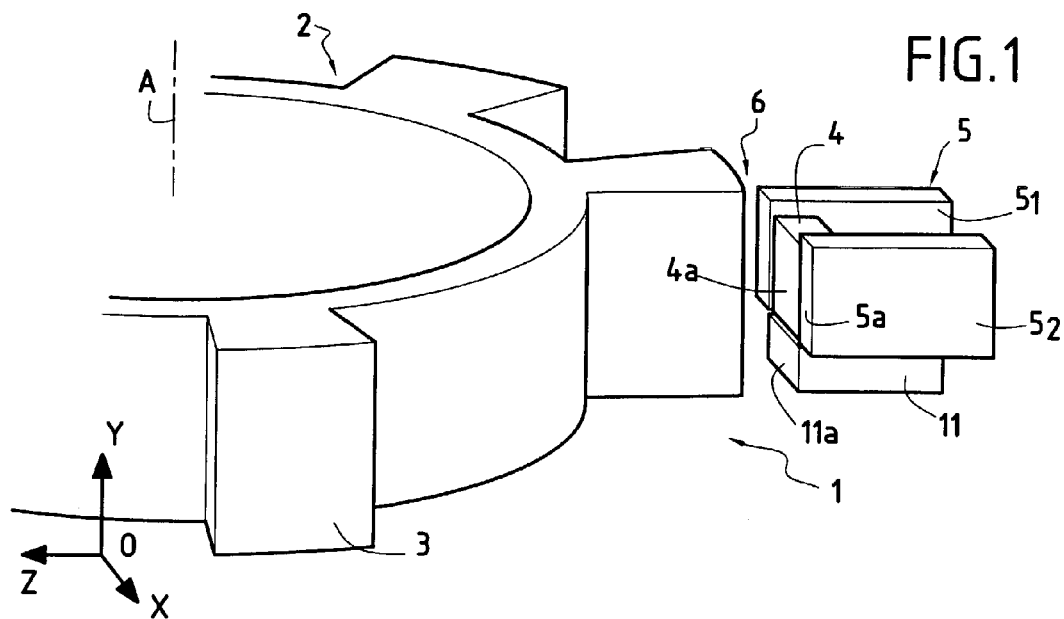
FIG. 1 is a diagrammatic perspective view of an example embodiment of a sensor according to the invention.

As can be seen in FIG. 1, the purpose of the invention relates to a sensor denoted as a whole by reference 1, capable of determining the position and/or speed of a mobile target 2 in the general sense. The mobile target 2 is made from a mild material, and in the example illustrated comprises at least one series of mobile teeth 3 along a direction perpendicular to an OZ direction. According to the variant embodiment shown, the mobile target 2 is a toothed wheel free to rotate about an axis A parallel to an OY direction perpendicular to the OZ direction. In this variant, the XOY plane is tangent to the surface of a tooth. Obviously, the mobile target 2 may be made by an element free to move along a linear trajectory. In a known manner, this mobile element 2 is added onto or integrated into a part driven in displacement.

The sensor 1 comprises a probe 4 sensitive to the direction and intensity of a magnetic induction. The probe 4 is placed in an extension plane parallel to the XOY plane such that its axis of greatest sensitivity is oriented approximately along the OZ axis. For example the probe 4 is a Hall effect probe.

Figure 2:
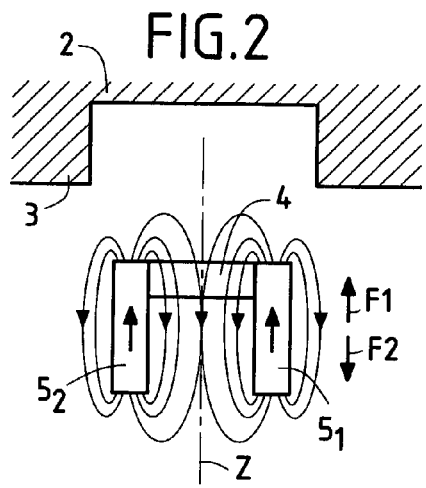
FIGS. 2 and 3 are diagrammatic top views of a sensor conform with the invention in the absence of a tooth and in the presence of a tooth respectively.

The sensor 1 also comprises a first permanent magnet 5 magnetized along a given direction $F_1$ parallel to the OZ direction and defining an air gap 6 with the mobile target 2. As can be seen more precisely in the example embodiment illustrated in FIG. 2, the first permanent magnet 5 is composed of a pair of permanent magnets $5_1$, $5_2$ separated from each other, parallel to each other and magnetized parallel to the OZ axis, along the $F_1$ direction towards the mobile target 2. Thus, one of the poles of each magnet $5_1$, $5_2$ is directed towards the target while the other pole is directed in the opposite direction $F_2$. When there is no tooth facing the first magnet 5, magnetic field lines are set up between the poles of each magnet $5_1$ and $5_2$. Note that the first magnet 5 may consist of magnet $5_1$ or magnet $5_2$ only.

The probe 4 is placed in the air gap 6 so that the magnetic induction generated by the first permanent magnet 5 passes through it along the OZ axis in a determined direction. In the example embodiment shown, the probe 4 is placed between the pair of permanent magnets $5_1$, $5_2$ so that the magnetic induction of the two magnets $5_1$, $5_2$ passes through it. When there is no tooth, the magnetic induction created by the first magnet 5 passes through the probe 4 along direction $F_2$ opposite to direction of magnetization $F_1$. It must be understood that the first magnet $5_1$, $5_2$ is offset laterally from the probe 4 such that its magnetic neutral line is outside the probe 4, in other words it does not intersect probe 4.

Figure 3:
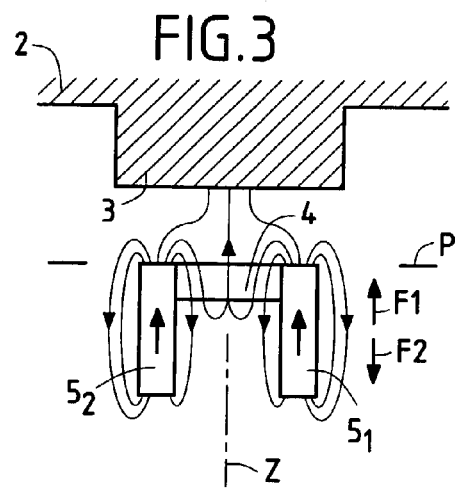

As can be clearly seen in FIG. 3, note that in the presence of a tooth 3 facing the first magnet 5, some of the magnetic field lines that looped back between the two poles of each magnet $5_1$, $5_2$ when there is no tooth, are diverted towards tooth 3. The absolute value of the magnetic induction measured by the probe 4 thus drops until it is close to a value equal to Zero Gauss, or possibly changes direction, in other words is set up in the opposite direction $F_1$.

Figure 4:
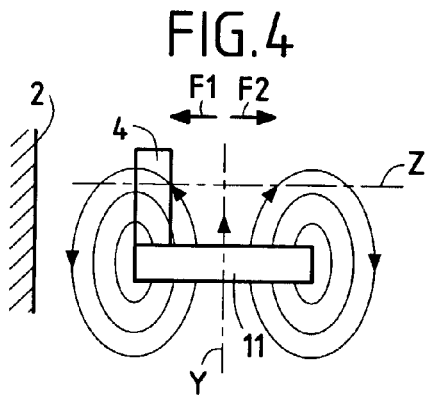
FIGS. 4 and 5 are diagrammatic side views of a sensor conform with the invention in the absence of a tooth and in the presence of a tooth respectively.
Figure 5:
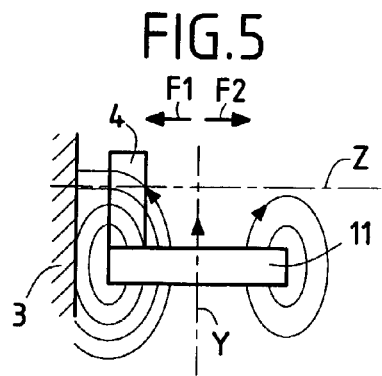

According to another characteristic of the invention, the sensor 1 comprises at least one second permanent magnet 11 magnetized along a direction perpendicular to the OZ direction such that the corresponding magnetic induction passes through the probe 4 along a direction opposite to the direction of the magnetic induction created by the first permanent magnet 5 and passing through the probe 4 in the absence of a tooth 3. In the example illustrated and as is clear in FIGS. 4 and 5, the magnetic induction created by the second permanent magnet 11 is such that it passes through the probe 4 along the OZ axis in the $F_1$ direction opposite to the direction $F_2$ of the magnetic induction created by the first permanent magnet 5 in the absence of a tooth. In the presence of a tooth (FIG. 5), the absolute value of the magnetic induction created by the second magnet 11 passing through the probe 4 along the Z axis and in the $F_1$ direction increases.

In the example illustrated, the second permanent magnet 11 is magnetized along the Y axis and is offset relative from the probe 4 along the OZ direction. This second permanent magnet 11 is placed such that the probe 4 is located between the mobile target 2 and the magnetic neutral line of the second magnet 11. In other words, the second permanent magnet 11 is located such that its magnetic neutral line is outside the probe 4 in other words it does not intersect the probe 4.

Furthermore, the second magnet 11 is offset from the probe 4 along the OY direction. In the illustrated example, the permanent magnet 11 is placed <<below>> the probe 4, but obviously the second permanent magnet 11 could be placed above the probe 4 in the XOZ plane. Note that identical results can be obtained with a permanent magnet 11 magnetized along the X axis and placed in the YOZ plane instead of a magnet $5_1$ or $5_2$.

According to one characteristic of the invention, the value of the magnetic induction created by the second permanent magnet 11 in the lack of a tooth is approximately equal to but in the direction opposite to the value of the magnetic induction created by the first permanent magnet 5. In the absence of a tooth 3, it is clear that the first permanent magnet 5 causes polarization of the magnetic induction in one direction $F_2$ while the second permanent magnet 11 causes polarization of the magnetic induction in the opposite direction $F_1$ such that superposition of their effects causes polarization close to a value equal to Zero Gauss. For example, in the absence of a tooth, the absolute value of the magnetic inductions created by the first 5 and second 11 permanent magnets are approximately equal to plus or minus 300 Gauss.

As is clear from the above description, the probe 4 is located on the OZ axis such that in the absence of a tooth 3, the values of the magnetic inductions created by the permanent magnets 5, 11 are approximately equal to each other but with opposite directions, while in the presence of a tooth 3, the absolute value of the variation in the magnetic induction detected by probe 4 is equal to or greater than a trip threshold. In the presence of a tooth, the variation of the magnetic induction passing through the probe 4 is the result of the variation of the magnetic induction created by the first magnet 5 and the variation of the magnetic induction created by the magnet 11, these variations being along the same direction. Therefore the superposition of the effects of the two magnets 5 and 11 contributes to a variation of the magnetic induction in the same direction in order to give a sufficient excursion level so that it can be detected with respect to a trip threshold fixed by a hysteresis comparator associated with the sensitive probe 4.

In the above description, the variation in the magnetic induction detected by the probe 4 is due to the contribution of variations of magnetic inductions created by the first 5 and second 11 magnets. This variation in the magnetic induction may originate essentially or entirely from a reduction in the absolute value of the magnetic induction created by the first magnet 5 or an increase in the absolute value of the magnetic induction created by the second magnet 11. Note that the variation in the magnetic induction detected by the probe 4 corresponding to the variation in the magnetic induction created by the first magnet 5 may correspond to an inversion in the direction of the magnetic induction created by this first magnet 5.

In the above description, magnetic inductions created by magnets 5 and 11 and passing through the probe 4 are along the $F_2$ and $F_1$ directions respectively. Obviously, the direction of magnetization of magnets 5 and 11 could be inverted.

As it is clear from the above description, the sensor according to the invention operates at inductions of close to Zero Gauss making them independent of changes in the magnet temperature, while providing a sufficient magnetic induction excursion. This sensor enables the use of sensors with simple shapes such that pure rare earth magnets can be used. Sensor performances are optimized by adjusting the dimensions and the relative position of the magnets and the relative position of the probe 4 with respect to the magnets 5, 11.

According to a preferred characteristic embodiment illustrated on the drawings, the sensor 1 according to the invention has an air gap plane P perpendicular to the OZ direction and in which one end face $5_a$ of the first permanent magnet 5 extends, an end face 11, of the second permanent magnet 11 and an end face $4_a$ of the probe 4. In other words, the magnets 5, 11 and the probe 4 are placed in a common plane that can extend very close to the plane through which the mobile target 2 passes, such that the width of the air gap 6 is small. To the extent that the magnets 5, 11 are located very close to the plane through which the mobile target 2 passes, the magnetic induction created by the magnets is relatively disturbed so that the sensitivity of the mobile target 2 can be increased. Similarly, the measurements made can be more sensitive since the probe 4 is located as close as possible to the plane through which the mobile target moves.

The invention is not limited to the example described and shown in the figures, since various modifications can be made without going outside its scope.

The invention claimed is:

1. Position and/or speed sensor comprising:
    a mobile target made of a soft material with at least one mobile tooth moving in a direction perpendicular to an axis OZ,
    a first pair of permanent magnets having a space therebetween, magnetized along a positive or negative OZ axis and defining an air gap with the mobile target,
    a probe sensitive to direction and intensity of a magnetic induction and mounted in the space between the first pair of permanent magnets, the probe being arranged in the air gap in an XOY extension plane such that its axis of greatest sensitivity is approximately along the OZ axis, and
    at least one second permanent magnet magnetized along a direction perpendicular to the OZ axis such that a corresponding magnetic induction passes through the probe in the direction opposite to the direction of magnetic induction created by the first pair of permanent magnets and passing through the probe, in the absence of an adjacent tooth,
    wherein the probe is located on the OZ axis such that when there is no adjacent tooth, the magnetic induction created by the first pair of magnets passes through the probe along a direction opposite to the direction of magnetization and magnetic inductions created by the first pair of magnets and at least one second permanent magnets have approximately equal values but in opposite directions, and
    wherein in the presence of an adjacent tooth, the absolute value of the variation of the magnetic induction detected by the probe is greater than a trip threshold.

2. Sensor according to claim 1, wherein the probe is located on the OZ axis such that in the presence of an adjacent tooth, the variation of the magnetic induction detected by the probe originates from a reduction in the absolute value or an inversion in the direction of the magnetic induction created by the pair of magnets.

3. Sensor according to claim 2, wherein the probe is located on the OZ axis so that in the presence of an adjacent tooth, the variation of magnetic induction detected by the probe originates from a variation of the magnetic induction created by the first pair of magnets, corresponding to an inversion in the direction of the magnetic induction.

4. Sensor according to claim 1, wherein the probe is located on the OZ axis so that in the presence of an adjacent tooth, the variation of magnetic induction detected by the probe originates from an increase in the absolute value of the magnetic induction created by the second magnet.

5. Sensor according to claim 1, wherein the probe is located on the OZ axis so that in the absence of an adjacent tooth, the absolute values of the magnetic inductions created by the permanent magnets are approximately equal to 300 Gauss.

6. Sensor according to claim 1, wherein the first pair of permanent magnets and the at least one second permanent magnet are placed such that magnetic neutral lines of the magnets are outside the probe.

7. Sensor according to claim 1, having an air gap plane perpendicular to the OZ axis in which one end face of the first pair of permanent magnets, an end face of the at least one second permanent magnet and an end face of the probe are located.

8. Sensor according to claim 1, wherein the at least one second magnet extends between the pair of first magnets.

9. Sensor according to claim 1, wherein the at least one second magnet is mounted with respect to the probe such that the probe is located between the mobile target and a magnetic neutral line of the second magnet.

* * * * *